US012706788B2

(12) United States Patent
Chi et al.

(10) Patent No.: US 12,706,788 B2
(45) Date of Patent: Aug. 11, 2026

(54) ORBITAL ANGULAR MOMENTUM-BASED COMMUNICATION METHOD AND APPARATUS AND DEVICE

(71) Applicant: Beijing Xiaomi Mobile Software Co., Ltd., Beijing (CN)

(72) Inventors: Liangang Chi, Beijing (CN); Gaoming Duan, Beijing (CN); Feng Zheng, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 218 days.

(21) Appl. No.: 18/689,341

(22) PCT Filed: Sep. 13, 2021

(86) PCT No.: PCT/CN2021/118030
§ 371 (c)(1),
(2) Date: Sep. 10, 2024

(87) PCT Pub. No.: WO2023/035273
PCT Pub. Date: Mar. 16, 2023

(65) Prior Publication Data
US 2025/0007761 A1 Jan. 2, 2025

(51) Int. Cl.
*H04L 27/28* (2006.01)
*H04L 27/00* (2006.01)
*H04L 27/26* (2006.01)

(52) U.S. Cl.
CPC ...... *H04L 27/0012* (2013.01); *H04L 27/2697* (2013.01)

(58) Field of Classification Search
CPC .... H04B 7/0617; H04B 7/0413; H04B 10/40; H04B 10/523; H04L 27/2601;
(Continued)

(56) References Cited

U.S. PATENT DOCUMENTS

2015/0333865 A1* 11/2015 Yu ...................... H04B 10/5161 398/44
2019/0334609 A1 10/2019 Alavi et al.
(Continued)

FOREIGN PATENT DOCUMENTS

CN 112737714 A 4/2021
CN 112887989 A 6/2021
(Continued)

OTHER PUBLICATIONS

Extended European Search Report issued in Application No. 21956451.5 dated Oct. 18, 2024, 9 pages.
(Continued)

*Primary Examiner* — Khai Tran
(74) *Attorney, Agent, or Firm* — Finnegan, Henderson, Farabow, Garrett & Dunner, L.L.P.

(57) ABSTRACT

An orbital angular momentum (OAM)-based communication method, includes: obtaining, by a terminal device, a first OAM mode indicated by a network device; and transmitting, by the terminal device, a control channel according to the first OAM mode, after entering a connected state; wherein the first OAM mode includes at least one OAM mode of: an OAM mode with an eigenvalue of −1, an OAM mode with an eigenvalue of 0, or an OAM mode with an eigenvalue of 1.

18 Claims, 7 Drawing Sheets

(58) Field of Classification Search
CPC ......... H04L 27/26723; H04L 25/03006; H04L 25/03343; H04L 9/0858; H04L 9/0637; G02B 6/293; G02B 6/2938; H04J 14/07
USPC ................................ 375/260, 262, 267, 299
See application file for complete search history.

(56) References Cited

U.S. PATENT DOCUMENTS

| | | | | |
|---|---|---|---|---|
| 2020/0050959 | A1 | 2/2020 | Ashrafi | |
| 2021/0021053 | A1 | 1/2021 | Sasaki et al. | |
| 2022/0123782 | A1 * | 4/2022 | Cheng | H04B 1/715 |
| 2022/0329293 | A1 | 10/2022 | Tian et al. | |
| 2022/0360330 | A1 | 11/2022 | Lee et al. | |
| 2023/0006719 | A1 * | 1/2023 | Ashrafi | H04B 7/0413 |
| 2024/0223267 | A1 * | 7/2024 | Zhang | H04B 7/18506 |
| 2024/0380509 | A1 * | 11/2024 | Zheng | H04B 10/2581 |

FOREIGN PATENT DOCUMENTS

| | | | |
|---|---|---|---|
| WO | WO 2020/262744 | A1 | 12/2020 |
| WO | WO 2021/128022 | A1 | 7/2021 |

OTHER PUBLICATIONS

Yang Qi et al., "Capacity Analysis of OAM Millimeter Communication System in the Off-axis Misalignment Case", Journal of Signal Processing, vol. 35, No. 3, Mar. 2019, pp. 490-498.

International Search Report of International Application No. PCT/CN2021/118030, dated Apr. 7, 2022, 4 pages.

* cited by examiner

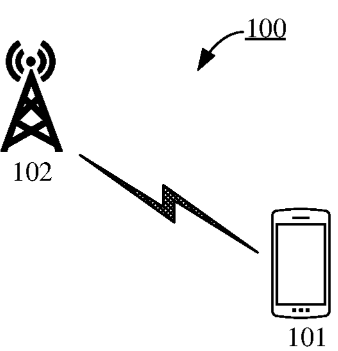
FIG. 1
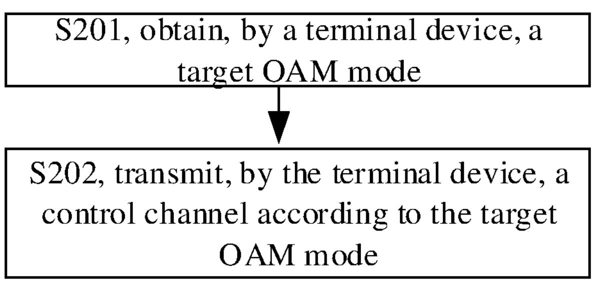
FIG. 2
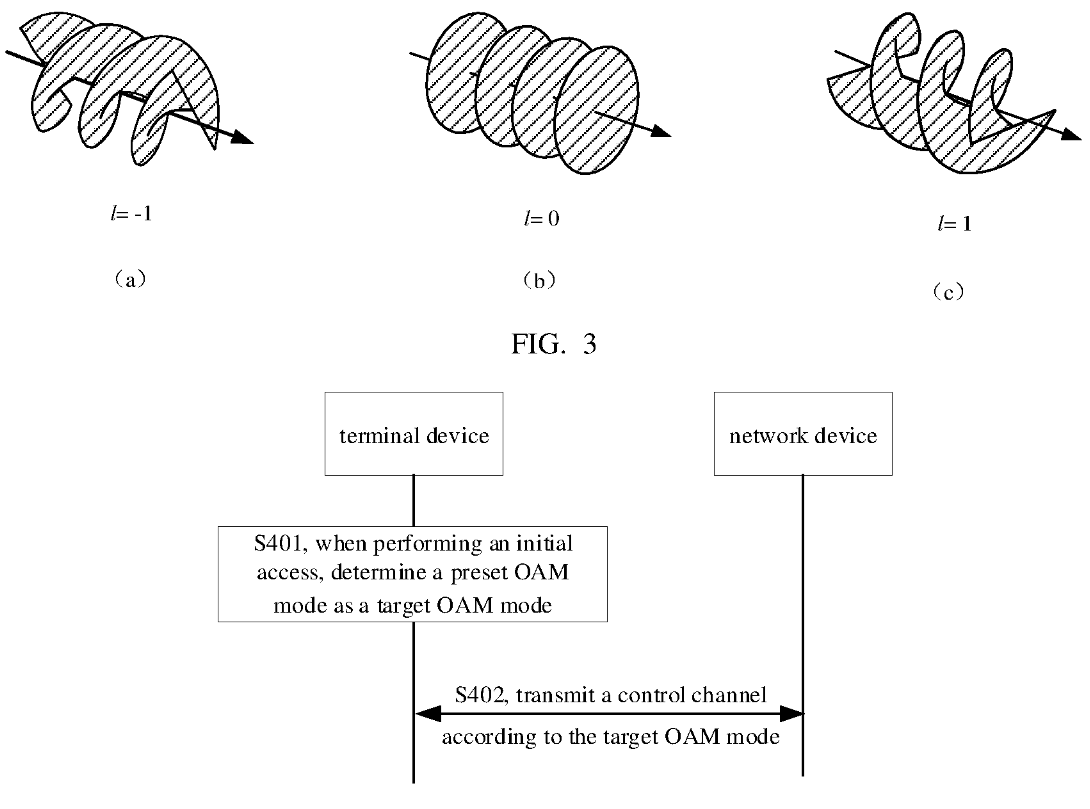
FIG. 3
FIG. 4

ORBITAL ANGULAR MOMENTUM-BASED COMMUNICATION METHOD AND APPARATUS AND DEVICE

CROSS-REFERENCE

The present application is a U.S. National Stage of International Application No. PCT/CN2021/118030, filed on Sep. 13, 2021, the content of which is incorporated herein by reference in its entirety.

TECHNICAL FIELD

The present disclosure relates to the field of wireless communication technologies, and in particular to an orbital angular momentum (OAM)-based communication method, apparatus and device.

BACKGROUND

With the continuous development of wireless communications, requirements for communication capabilities are increasingly high. For future application scenarios such as augmented reality (AR), virtual reality (VR), Internet of Vehicles, and Internet of Things, ultra-high speed, ultra-low latency, and ultra-large bandwidth communications have become the norm. In order to meet this requirement, the concept of vortex electromagnetic waves is proposed and connected with an OAM. The OAM is independent of traditional modulation dimensions such as phase, frequency, and polarization, and is considered to be a new modulation dimension. Moreover, OAM modes carried by the vortex electromagnetic waves theoretically have an infinite number, and OAM beams with different integer eigenvalues are orthogonal to each other. In theory, spectrum utilization can be infinitely improved.

SUMMARY

The present disclosure provides an OAM-based communication method, apparatus and device.

In a first aspect, the present disclosure provides an OAM-based communication method, which may be applied to a terminal device in an OAM-based communication system. The method may include: obtaining, by the terminal device, a target OAM mode; and transmitting, by the terminal device, a control channel according to the target OAM mode.

In a second aspect, the present disclosure provides an OAM-based communication method, which may be applied to a network device in an OAM-based communication system. The method may include: determining, by the network device, a target OAM mode; and transmitting, by the network device, a control channel according to the target OAM mode.

In a third aspect, the present disclosure provides a communication device, which may be the above terminal device in the OAM-based communication system or a chip in the terminal device or a system-on-chip, or may also be a function module in the terminal device configured to implement the method in the first aspect. The communication device may realize functions performed by the terminal device in the first aspect, and these functions may be realized by hardware executing corresponding software. The hardware or software includes one or more modules corresponding to the above functions. The communication device includes: a first processing module, configured to obtain a first OAM mode indicated by a network device; and a first transmission module, configured to transmit a control channel according to the first OAM mode after entering a connected state.

In a fourth aspect, the present disclosure provides a communication device, which may be the above network device in the OAM-based communication system or a chip in the network device or a system-on-chip, or may also be a function module in the network device configured to implement the method in the second aspect. The communication device may realize functions performed by the network device in the second aspect, and these functions may be realized by hardware executing corresponding software. The hardware or software includes one or more modules corresponding to the above functions. The communication device includes: a third processing module, configured to determine a first OAM mode; and a third transmission module, configured to indicate the first OAM mode to a terminal device, wherein the first OAM mode is used by the terminal device to transmit a control channel.

In a fifth aspect, the present disclosure further provides a communication device, such as a terminal device, which may include: a memory; and a processor connected to the memory and configured to execute computer-executable instructions stored on the memory to implement the OAM-based communication method in the first aspect and any of implementations of the first aspect.

In a sixth aspect, the present disclosure further provides a communication device, such as a network device, which may include: a memory; and a processor connected to the memory and configured to execute computer-executable instructions stored on the memory to implement the OAM-based communication method in the second aspect and any of implementations of the second aspect.

In a seventh aspect, the present disclosure further provides a computer storage medium and a processing module, wherein computer-executable instructions are stored on the computer storage medium, and the computer-executable instructions, when executed by a processor, implement the OAM-based communication method in the first to second aspects and any of implementations of the first to second aspects.

BRIEF DESCRIPTION OF THE DRAWINGS

FIG. 1 is a schematic structural diagram of a communication system according to an embodiment of the present disclosure;

FIG. 2 is a schematic flowchart of a first OAM-based communication method according to an embodiment of the present disclosure;

FIG. 3 is a schematic diagram of electromagnetic waves with different orbital angular momenta according to an embodiment of the present disclosure;

FIG. 4 is a schematic flowchart of a second OAM-based communication method according to an embodiment of the present disclosure;

DETAILED DESCRIPTION

Figure 5:
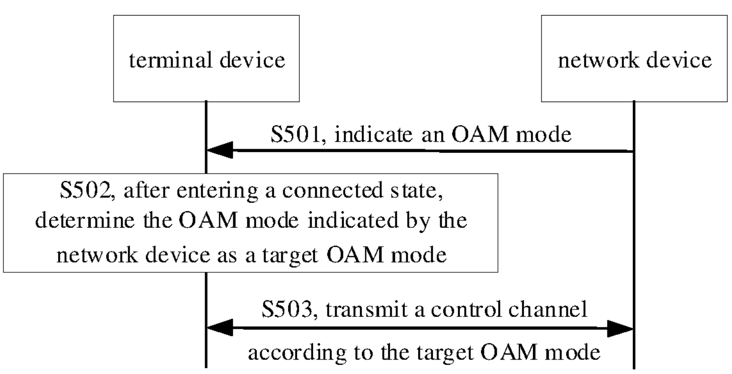
FIG. 5 is a schematic flowchart of a third OAM-based communication method according to an embodiment of the present disclosure.

Reference will now be made in detail to embodiments, examples of which are illustrated in the accompanying drawings. The following description refers to the accompanying drawings in which the same numbers in different drawings represent the same or similar elements unless otherwise represented. Implementations set forth in the following description of the embodiments do not represent all implementations consistent with embodiments of the present disclosure. Instead, they are merely examples of apparatuses and methods consistent with some aspects related to the embodiments of the present disclosure as recited in the appended claims.

The terms used in embodiments of the present disclosure are merely for the purpose of describing particular embodiments and are not intended to limit the embodiments of the present disclosure. As used in the embodiments of the present disclosure and the appended claims, the singular forms "a", and "the" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in embodiments of the present disclosure to describe various information, such information should not be limited to these terms. These terms are only used to distinguish the same type of information from each other. For example, without departing from the scope of the embodiments of the present disclosure, the first information may also be referred to as the second information, and similarly, the second information may also be referred to as the first information. Depending on the context, the word "if" as used herein can be interpreted as "upon" or "when" or "in response to determination".

With the continuous development of wireless communications, requirements for communication capabilities are increasingly high. For future application scenarios such as augmented reality (AR), virtual reality (VR), Internet of Vehicles, and Internet of Things, ultra-high speed, ultra-low latency, and ultra-large bandwidth communications have become the norm. In order to meet this requirement, the concept of vortex electromagnetic waves is proposed and connected with an orbital angular momentum (OAM).

The orbital angular momentum (OAM) of the electromagnetic wave is an important physical quantity that is different from the electric field strength of the electromagnetic wave. An electromagnetic wave with the OAM may also be called a "vortex electromagnetic wave" with its phase plane spiral-shaped along a propagation direction, which is no longer a plane electromagnetic wave. The orbital angular momentum of the electromagnetic wave provides another dimension besides frequency, phase, and space. Electromagnetic waves whose OAM mode numbers (i.e., an eigenvalue, which may be denoted as l) have an integer multiple relationship are orthogonal to each other. Multichannel orthogonal signal may be transmitted at the same frequency point through OAM multiplexing, thereby improving spectrum efficiency and increasing channel capacity. Electromagnetic vortex waves with different mode numbers are orthogonal to each other. Therefore, during a wireless transmission process, the inherent orthogonality of the OAM modes is used to modulate the multi-channel signal onto different OAM modes, and different channels are distinguished according to the different modes. Since a spiral beam with an OAM can form an infinite-dimensional Hilbert space, infinite transmission capabilities can be theoretically obtained by using the OAM multiplexing at the same frequency point.

At present, common OAM-based wireless communication systems, such as uniform circular array (UCA)-based OAM communication systems, may be applied to communication systems based on cellular mobile communication technologies. FIG. 1 is a schematic structural diagram of a communication system according to an embodiment of the present disclosure. Referring to FIG. 1, the communication system 100 may include a terminal device 101 and a network device 102.

In an embodiment of the present disclosure, the terminal device 101 may be a device that provides voice connectivity or data connectivity for a user. In some embodiments of the present disclosure, the terminal device may also be referred to as a user equipment (UE), a mobile station, a subscriber unit, a station, a terminal equipment (TE) or the like. The terminal device may be a cellular phone, a personal digital assistant (PDA), a wireless modem, a handheld device, a laptop computer, a cordless phone, a wireless local loop (WLL) station, a pad, or the like. As wireless communications technologies develop, a device that can access the wireless communications system, a device that can communicate with a network side of the wireless communications system, or a device that can communicate with another device via the wireless communications system each may be a terminal device in embodiments of the present disclosure. For example, the terminal device may be a terminal or vehicle in intelligent transportation, a household device in a smart home, a voltage monitoring instrument, an environment monitoring instrument and an electricity meter reading instrument in a smart grid, a cash register and a video surveillance instrument in an intelligent security network, or the like. In embodiments of the present disclosure, the terminal device may communicate with the network device. The plurality of terminal devices may also communicate with each other. The terminal devices may be static and fixed, or may be mobile.

The network device 102 may be a device that supports the terminal access to the wireless communication system. For example, the network device 102 may be an evolved NodeB (eNB) in the 4G access technology communication system, a transmission reception point (TRP), a relay node, an access point (AP), a next generation NodeB (gNB) in the 5G access technology communication system, or the like. Alternatively, the network device 102 may also be an access network device in a next-generation wireless access communication network, which is not specifically limited in embodiments of the present disclosure.

In embodiments of the present disclosure, in the above communication system, a transceiver antenna axis is required to be aligned. When an axial deflection angle occurs between transceivers, a receiver will generate mode crosstalk, resulting in an increase in a bit error rate and a decrease in system performance. However, since a control channel (such as a PUCCH, a PDCCH, etc.) has high requirements on channel stability, high-quality connections are required in any scenario. Accordingly, in the OAM-based communication system, how to ensure stable transmission of the control channel has become an urgent problem to be solved.

In order to solve the above problems, embodiments of the present disclosure provide an OAM-based communication method, which may be applied to the terminal device in the above communication system.

FIG. 2 is a schematic flowchart of a first OAM-based communication method according to an embodiment of the present disclosure. Referring to FIG. 2, the method may include S201 and S202.

In the S201, the terminal device obtains a target OAM mode.

Here, the target OAM mode can be understood as a transmission mode for the control channel.

In embodiments of the present disclosure, the terminal device may obtain the target OAM mode according to a protocol provision, pre-negotiation with a network device, or an indication by the network device. For example, the terminal device may determine a preset OAM mode (i.e., a second OAM mode, a third OAM mode, or a fourth OAM mode) as the target OAM mode. Alternatively, the terminal device may determine an OAM mode (i.e., a first OAM mode) indicated by the network device as the target OAM mode. In some embodiments of the present disclosure, the preset OAM mode and the OAM mode indicated by the network device may be the same or different.

In an embodiment of the present disclosure, the preset OAM mode can be understood as an OAM mode (which can be understood as a default OAM mode) specified in a protocol, or the preset OAM mode may also be an OAM mode pre-negotiated between the terminal device and the network device. The OAM mode indicated by the network device can be understood as the target OAM mode configured by the network device for the terminal device.

In practical applications, the network device may indicate the target OAM mode to the terminal device by sending a radio resource control (RRC) signaling, downlink control information (DCI), and media access control layer control element (MAC CE) or another signaling.

In some embodiments of the present disclosure, signal to interference plus noise ratios (SINR) corresponding to different OAM modes are different due to the influence of different channel parameters. Specifically, the larger the SINR, the higher the stability of the OAM mode, and the smaller the absolute value of the eigenvalue, the larger the SINR of the OAM mode. Then, in order to ensure the stable transmission of the control channel and improve the robustness of the control channel, the terminal device and the network device may transmit the control channel according to an OAM mode with a smaller absolute value of the eigenvalue. For example, the terminal device and the network device may transmit the control channel according to OAM modes with eigenvalues of 0, ±1, ±2, ±3, etc.

In some embodiments of the present disclosure, the target OAM mode may include one or more OAM mode combinations, and each OAM mode combination may include at least one of the following OAM modes: an OAM mode with $l=-1$, an OAM mode with $l=0$, or an OAM mode with $l=1$. It can be understood that $l$ of the target OAM mode may include one or more of the following combinations: [0], [1], [−1], [−1, 1], [0, −1], [0, 1], [−1, 0, 1].

For example, FIG. 3 is a schematic diagram of electromagnetic waves with different orbital angular momenta according to an embodiment of the present disclosure. Referring to FIG. 3, (a) shows an electromagnetic wave with an OAM mode of $l=-1$, (b) shows an electromagnetic wave with an OAM mode of $l=0$, and (c) shows an electromagnetic wave with an OAM mode of $l=1$.

In the step S202, the terminal device transmits a control channel according to the target OAM mode.

In some embodiments of the present disclosure, when the target OAM mode includes one OAM mode combination, that is, when $l$ of the target OAM mode is one of the above combinations, the terminal device may transmit the control channel according to one or more OAM modes in the OAM mode combination. For example, if $l$ of the target OAM mode is [−1], the terminal device may transmit the control channel according to the OAM mode of $l=-1$ (that is, the OAM mode shown in (a) of FIG. 3). Alternatively, $l$ of the target OAM mode is [−1, 1], and the terminal device may transmit the control channel in parallel according to the OAM mode of $l=-1$ (that is, the OAM mode shown in (a) of FIG. 3) and the OAM mode of $l=1$ (that is, the OAM mode shown in (c) of FIG. 3).

In some embodiments of the present disclosure, when the target OAM mode includes a plurality of OAM mode combinations, that is, when $l$ of the target OAM mode is more than one of the above combinations, the terminal device may call the plurality of OAM mode combinations in a polling manner to transmit the control channel. For example, $l$ of the target OAM mode is [−1] and [0], the terminal device may first transmit the control channel according to the OAM mode of $l=-1$ (that is, the OAM mode shown in (a) of FIG. 3), and then transmit the control channel according to the OAM mode of $l=0$ (that is, the OAM mode shown in (b) of FIG. 3). Alternatively, $l$ of the target OAM mode is [0] and [−1, 1], and the terminal device may first transmit the control channel according to the OAM mode of $l=0$ (i.e., the OAM mode shown in (c) of FIG. 3), and then transmit the control channel in parallel according to the OAM mode of $l=-1$ (that is, the OAM mode shown in (a) of FIG. 3) and the OAM mode of $l=1$ (that is, the OAM mode shown in (c) of FIG. 3).

It should be noted that the above OAM mode combination is only an example without specifically limiting the target OAM mode.

At this point, the transmission of the control channel is completed.

In embodiments of the present disclosure, the terminal device transmits the control channel according to the OAM mode with better stability, that is, one or more OAM modes among the OAM mode with the eigenvalue of −1, the OAM mode with the eigenvalue of 0, and the OAM mode with the eigenvalue of 1.

In embodiments of the present disclosure, there is further provided an OAM-based communication method, which may be applied to the terminal device in the above communication system.

FIG. 4 is a schematic flowchart of a second OAM-based communication method according to an embodiment of the present disclosure. Referring to FIG. 4, the method may include S401 and S402.

In the S401, when performing an initial access, the terminal device determines a preset OAM mode (i.e., a second OAM mode or a third OAM mode) as a target OAM mode.

Here, the preset OAM mode can be understood as a transmission mode for the control channel.

It can be understood that before the terminal device initially accesses a network device, there is no signaling interaction between the terminal device and the network device. Then, during the initial access of the terminal device to the network device, the terminal device and the network device may transmit the control channel according to an OAM mode (i.e., a default OAM mode) specified in a protocol.

In some embodiments of the present disclosure, SINRs corresponding to different OAM modes are different due to the influence of different channel parameters. Specifically, the larger the SINR, the higher the stability of the OAM mode, and the smaller the absolute value of the eigenvalue, the larger the SINR of the OAM mode. Then, in order to ensure the stable transmission of the control channel and improve the robustness of the control channel, the terminal device and the network device may transmit the control channel according to an OAM mode with a smaller absolute value of the eigenvalue. For example, the terminal device and the network device may transmit the control channel according to OAM modes with eigenvalues of 0, ±1, +2, +3, etc.

In some embodiments of the present disclosure, the preset OAM mode may include one or more OAM mode combinations, and each OAM mode combination may include at least one of the following OAM modes: an OAM mode with $l=-1$, an OAM mode with $l=0$, or an OAM mode with $l=1$. It can be understood that $l$ of the target OAM mode may include one or more of the following combinations: [0], [1], [−1], [−1, 1], [0, −1], [0, 1], [−1, 0, 1].

For example, FIG. 3 is a schematic diagram of electromagnetic waves with different orbital angular momenta according to an embodiment of the present disclosure. Referring to FIG. 3, (a) shows an electromagnetic wave with an OAM mode of $l=-1$, (b) shows an electromagnetic wave with an OAM mode of $l=0$, and (c) shows an electromagnetic wave with an OAM mode of $l=1$.

In the S402, the terminal device transmits a control channel according to the target OAM mode.

Here, for an execution process of S402, reference may be made to a specific description of S202 in embodiments of FIG. 2, which will not be described in detail here.

At this point, the transmission of the control channel is completed.

In embodiments of the present disclosure, during the initial access with the network device, the terminal device transmits the control channel according to the OAM mode with better stability, that is, one or more OAM modes among the OAM mode with the eigenvalue of −1, the OAM mode with the eigenvalue of 0, and the OAM mode with the eigenvalue of 1.

In embodiments of the present disclosure, there is further provided an OAM-based communication method, which may be applied to the terminal device in the above communication system.

FIG. 5 is a schematic flowchart of a third OAM-based communication method according to an embodiment of the present disclosure. Referring to FIG. 5, the method may include S501 to S503.

In the S501, the terminal device obtains an OAM mode (i.e., a first OAM mode) indicated by a network device.

In some implementations of the present disclosure, the terminal device may receive transmission mode indication information sent by the network device. The transmission mode indication information is configured to indicate to the terminal device the OAM mode configured by the network device for the terminal device, so that the terminal device can determine a target OAM mode according to the transmission mode indication information.

In practical applications, the network device may set corresponding index values for different OAM modes, and the network device sends to the terminal device an index value corresponding to the target OAM mode, so that the terminal device determines the target OAM mode based on the index value. Alternatively, the network device may directly send an eigenvalue of the target OAM mode to the terminal device, so that the terminal device determines the target OAM mode based on the eigenvalue. Alternatively, the network device may also set other identities for different OAM modes to characterize the target OAM mode configured by the network device for the terminal device.

In some implementations of the present disclosure, the network device may indicate the target OAM mode to the terminal device through the RRC signaling, the DCI, the MAC CE, etc.

It should be noted that the OAM mode indicated by the network device may include one or more OAM mode combinations, and each OAM mode combination may include at least one of the following OAM modes: an OAM mode with $l=-1$, an OAM mode with $l=0$, or an OAM mode with $l=1$. It can be understood that $l$ of the OAM mode may include one or more of the following combinations: [0], [1], [−1], [−1, 1], [0, −1], [0, 1], [−1, 0, 1].

In practical applications, S501 may be executed during the access (such as the initial access, the re-access, etc.) to the network device by the terminal device, or when the network device updates an OAM mode configuration. Alternatively, S501 may also be executed at other timings, which are not specifically limited by embodiments of the present disclosure.

In the S502, after entering a connected state, the terminal device determines the OAM mode indicated by the network device as a target OAM mode.

Here, the terminal device enters the connected state after accessing the network device. Next, the terminal device may determine the OAM mode indicated by the network device in S501 as the target OAM mode for the subsequent control channel transmission.

In the S503, the terminal device transmits a control channel according to the target OAM mode.

Here, for an execution process of S503, reference may be made to a specific description of S202 in embodiments of FIG. 2, which will not be described in detail here.

Figure 6:
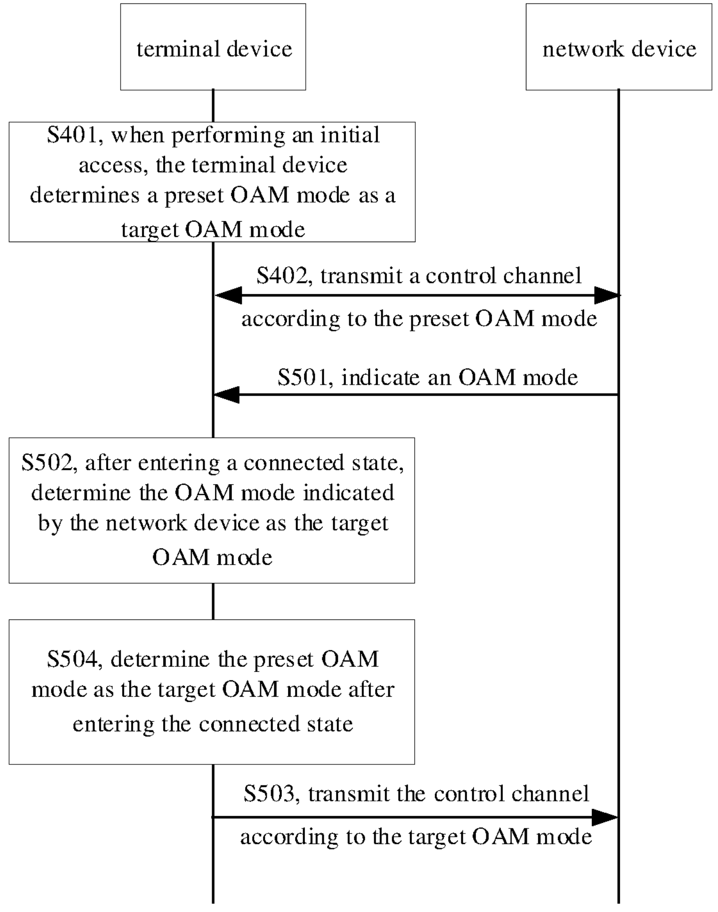
FIG. 6 is a schematic flowchart of an implementation of a fourth OAM-based communication method according to an embodiment of the present disclosure.

In some implementations of the present disclosure, FIG. 6 is a schematic flowchart of an implementation of a fourth OAM-based communication method according to an embodiment of the present disclosure. As shown in FIG. 6, after completing the initial access by transmitting the control channel according to the preset OAM mode through the above S401 to S402, the terminal device enters the connected state, and thereafter, if the network device indicates the target OAM mode to the terminal device, the terminal executes S501 to S502, and on the contrary, if the network device does not indicate the target OAM mode to the terminal device, the method further includes: in S504, the terminal device determines the preset OAM mode as the target OAM mode after entering the connected state, that is, the terminal device still determines the preset OAM mode as the target OAM mode. Next, after determining the target OAM mode, the terminal device continues to execute S503.

It can be understood that in embodiments of FIG. 6, the terminal device uses the preset OAM mode as the target OAM mode during the initial access to transmit the control channel. After completing the initial access and entering the connected state, the terminal device may use the OAM mode indicated by the network device as the target OAM mode to transmit the control channel. After the terminal device enters the connected state, if the network device does not indicate the OAM mode, the terminal device still uses the preset OAM mode as the target OAM mode to transmit the control channel.

In some implementations of the present disclosure, the one or more OAM mode combinations may be arranged in a fixed order. The network device may configure for the terminal device an arrangement manner and the number of one or more OAM mode combinations, and indicates them to the terminal device.

Figure 7:
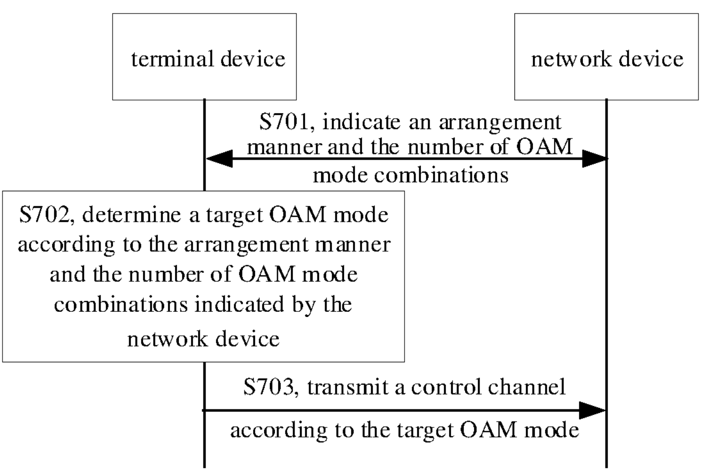
FIG. 7 is a schematic flowchart of an implementation of a fifth OAM-based communication method according to an embodiment of the present disclosure.

FIG. 7 is a schematic flowchart of an implementation of a fifth OAM-based communication method according to an embodiment of the present disclosure. Referring to FIG. 7, the method includes S701 to S703.

In the S701, a terminal device obtains an arrangement manner and the number of OAM mode combinations indicated by a network device.

In the S702, the terminal device determines a target OAM mode according to the arrangement manner and the number of OAM mode combinations indicated by the network device.

Here, in S701 to S702, the one or more OAM mode combinations may be arranged in a fixed order. For example, l of the OAM modes may be arranged in the following order: [0], [1], [−1], [−1, 1], [0, −1], [0, 1], [−1, 0, 1]. The network device may indicate the arrangement manner and the number of OAM mode combinations to the terminal device. For example, the network device indicates the above arrangement order to the terminal device, and indicates that the number of OAM mode combinations is 3. In this case, l of the OAM modes indicated by the network device is [0], [1], [−1], that is, the first three OAM mode combinations in the above arrangement order. Then, the terminal device determines the OAM modes whose l is [0], [1], [−1] as the target OAM mode. Alternatively, the arrangement order of one or more OAM mode combinations may also be in other orders, which is not specifically limited in embodiments of the present disclosure.

In the S703, the terminal device transmits a control channel according to the target OAM mode.

Here, for an execution process of S703, reference may be made to a specific description of S202 in embodiments of FIG. 2, which will not be described in detail here.

At this point, the transmission of the control channel is completed.

In embodiments of the present disclosure, during the initial access of the terminal device, the terminal device transmits the control channel according to the OAM mode with better stability, that is, one or more OAM modes among the OAM mode with the eigenvalue of −1, the OAM mode with the eigenvalue of 0, and the OAM mode with the eigenvalue of 1, thereby increasing the robustness of the control channel and improving the reliability of the system.

Based on the same inventive concept, embodiments of the present disclosure further provide an OAM-based communication method, which may be applied to the network device in the above communication system.

Figure 8:
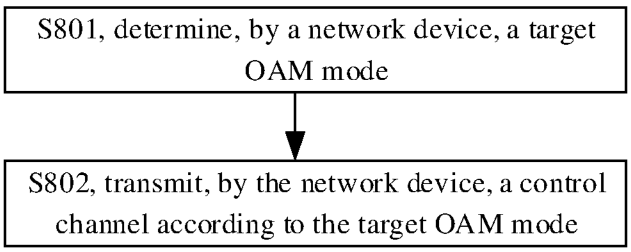
FIG. 8 is a schematic flowchart of a sixth OAM-based communication method according to an embodiment of the present disclosure.

FIG. 8 is a schematic flowchart of a sixth OAM-based communication method according to an embodiment of the present disclosure. Referring to FIG. 8, the method may include S801 to S802.

In the S801, the network device determines a target OAM mode.

Here, the target OAM mode can be understood as a transmission mode for the control channel.

In embodiments of the present disclosure, the network device may determine the target OAM mode according to a protocol provision, pre-negotiation with a terminal device, or based on a transmission requirement of data delay and data volume. For example, the network device may determine a preset OAM mode (i.e., a second OAM mode or a fourth OAM mode) as the target OAM mode; or, the network device may determine the target OAM mode (such as a first OAM mode) based on the transmission requirement of the data delay and the data volume.

In an embodiment of the present disclosure, the preset OAM mode can be understood as an OAM mode (which can be understood as a default OAM mode) specified in a protocol, or the preset OAM mode may also be an OAM mode pre-negotiated between the terminal device and the network device. The OAM mode determined by the network device can be understood as the target OAM mode determined by the network device based on the transmission requirement of the data delay and the data volume.

In some embodiments of the present disclosure, SINRs corresponding to different OAM modes are different due to the influence of different channel parameters. Specifically, the larger the SINR, the higher the stability of the OAM mode, and the smaller the absolute value of the eigenvalue, the larger the SINR of the OAM mode. Then, in order to ensure the stable transmission of the control channel and improve the robustness of the control channel, the terminal device and the network device may transmit the control channel according to an OAM mode with a smaller absolute value of the eigenvalue. For example, the terminal device and the network device may transmit the control channel according to OAM modes with eigenvalues of 0, ±1, ±2, ±3, etc.

In some embodiments of the present disclosure, the OAM mode determined by the network device may include one or more OAM mode combinations, and each OAM mode combination may include at least one of the following OAM modes: an OAM mode with l=−1, an OAM mode with l=0, or an OAM mode with l=1. It can be understood that l of the OAM mode determined by the network device may include one or more of the following combinations: [0], [1], [−1], [−1, 1], [0, −1], [0, 1], [−1, 0, 1].

For example, still referring to FIG. 3, (a) shows an electromagnetic wave with an OAM mode of l=−1, (b) shows an electromagnetic wave with an OAM mode of l=0, and (c) shows an electromagnetic wave with an OAM mode of l=1.

In some implementations of the present disclosure, after S801, the method further includes: the network device indicates the target OAM mode (i.e., the above OAM mode determined by the network device) to the terminal device. For example, the network device may indicate the target OAM mode to the terminal device by sending a RRC signaling, DCI, MAC CE or another signaling.

In the S802, the network device transmits a control channel according to the target OAM mode.

In some embodiments of the present disclosure, when the target OAM mode includes one OAM mode combination, that is, when l of the target OAM mode is one of the above combinations, the network device may transmit the control channel according to one or more OAM modes in the OAM mode combination. For example, if l of the target OAM mode is [−1], the network device may transmit the control channel according to the OAM mode of l=−1 (that is, the OAM mode shown in (a) of FIG. 3). Alternatively, l of the target OAM mode is [−1, 1], and the network device may transmit the control channel in parallel according to the OAM mode of l=−1 (that is, the OAM mode shown in (a) of FIG. 3) and the OAM mode of l=1 (that is, the OAM mode shown in (c) of FIG. 3).

In some embodiments of the present disclosure, when the target OAM mode includes a plurality of OAM mode combinations, that is, when l of the target OAM mode is more than one of the above combinations, the network device may call the plurality of OAM mode combinations in a polling manner to transmit the control channel. For example, l of the target OAM mode is [−1] and [0], the network device may first transmit the control channel according to the OAM mode of l=−1 (that is, the OAM mode shown in (a) of FIG. 3), and then transmit the control channel according to the OAM mode of l=0 (that is, the OAM mode shown in (b) of FIG. 3). Alternatively, l of the target OAM mode is [0] and [−1, 1], and the network device may first transmit the control channel according to the OAM mode of l=0 (i.e., the OAM mode shown in (c) of FIG. 3), and then transmit the control channel in parallel according to the OAM mode of l=−1 (that is, the OAM mode shown in (a) of FIG. 3) and the OAM mode of l=1 (that is, the OAM mode shown in (c) of FIG. 3).

It should be noted that the above OAM mode combination is only an example without specifically limiting the target OAM mode.

At this point, the transmission of the control channel is completed.

In embodiments of the present disclosure, the network device transmits the control channel according to the OAM mode with better stability, that is, one or more OAM modes among the OAM mode with the eigenvalue of −1, the OAM mode with the eigenvalue of 0, and the OAM mode with the eigenvalue of 1.

In embodiments of the present disclosure, there is further provided an OAM-based communication method, which may be applied to the network device in the above communication system.

Figure 9:
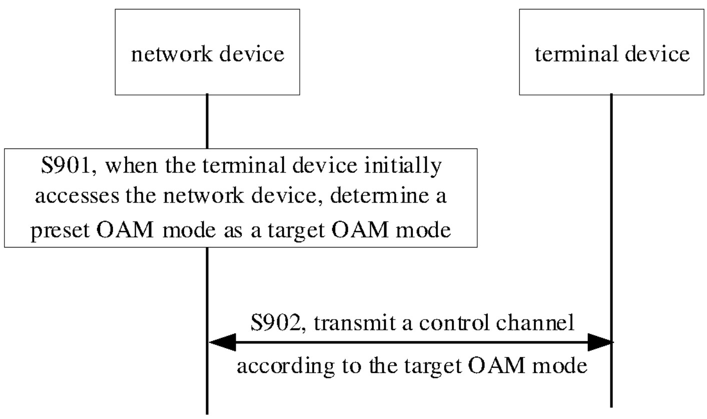
FIG. 9 is a schematic flowchart of a seventh OAM-based communication method according to an embodiment of the present disclosure.

FIG. 9 is a schematic flowchart of a seventh OAM-based communication method according to an embodiment of the present disclosure. Referring to FIG. 9, the method may include S901 to S902.

In the S901, when a terminal device initially accesses the network device, the network device determines a preset OAM mode (i.e., a fourth OAM mode) as a target OAM mode.

Here, the target OAM mode can be understood as a transmission mode for the control channel.

It can be understood that before the terminal device performs the initial access, there is no signaling interaction between the terminal device and the network device. Then, during the initial access of the terminal device to the network device, the terminal device and the network device may transmit the control channel according to an OAM mode specified in a protocol.

In some embodiments of the present disclosure, SINRs corresponding to different OAM modes are different due to the influence of different channel parameters. Specifically, the larger the SINR, the higher the stability of the OAM mode, and the smaller the absolute value of the eigenvalue, the larger the SINR of the OAM mode. Then, in order to ensure the stable transmission of the control channel and improve the robustness of the control channel, the terminal device and the network device may transmit the control channel according to an OAM mode with a smaller absolute value of the eigenvalue. For example, the terminal device and the network device may transmit the control channel according to OAM modes with eigenvalues of 0, ±1, ±2, ±3, etc.

In some embodiments of the present disclosure, the preset OAM mode may include one or more OAM mode combinations, and each OAM mode combination may include at least one of the following OAM modes: an OAM mode with l=−1, an OAM mode with l=0, or an OAM mode with l=1. It can be understood that l of the target OAM mode may include one or more of the following combinations: [0], [1], [−1], [−1, 1], [0, −1], [0, 1], [−1, 0, 1].

For example, FIG. 3 is a schematic diagram of electromagnetic waves with different orbital angular momenta according to an embodiment of the present disclosure. Referring to FIG. 3, (a) shows an electromagnetic wave with an OAM mode of l=−1, (b) shows an electromagnetic wave with an OAM mode of l=0, and (c) shows an electromagnetic wave with an OAM mode of l=1.

In the S902, the network device transmits a control channel according to the target OAM mode.

Here, for an execution process of S902, reference may be made to a specific description of S802 in embodiments of FIG. 8, which will not be described in detail here.

At this point, the transmission of the control channel is completed.

In embodiments of the present disclosure, the network device transmits the control channel according to the OAM mode with better stability, that is, one or more OAM modes among the OAM mode with the eigenvalue of −1, the OAM mode with the eigenvalue of 0, and the OAM mode with the eigenvalue of 1, thereby increasing the robustness of the control channel and improving the reliability of the system.

In embodiments of the present disclosure, there is further provided an OAM-based communication method, which may be applied to the network device in the above communication system.

Figure 10:
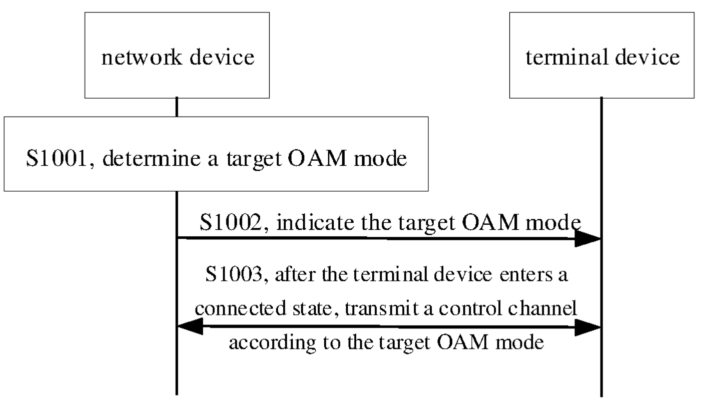
FIG. 10 is a schematic flowchart of an eighth OAM-based communication method according to an embodiment of the present disclosure.

FIG. 10 is a schematic flowchart of an eighth OAM-based communication method according to an embodiment of the present disclosure. Referring to FIG. 10, the method may include S1001 to S1003.

In the S1001, the network device determines a target OAM mode (i.e., a second OAM mode).

Here, the target OAM mode can be understood as a transmission mode for the control channel.

In an embodiment, the network device may determine the target OAM mode according to the transmission requirement of the data delay and the data volume.

In some embodiments of the present disclosure, SINRs corresponding to different OAM modes are different due to the influence of different channel parameters. Specifically, the larger the SINR, the higher the stability of the OAM mode, and the smaller the absolute value of the eigenvalue, the larger the SINR of the OAM mode. Then, in order to ensure the stable transmission of the control channel and improve the robustness of the control channel, the terminal device and the network device may transmit the control channel according to an OAM mode with a smaller absolute value of the eigenvalue. For example, the terminal device and the network device may transmit the control channel according to OAM modes with eigenvalues of 0, ±1, +2, +3, etc.

In some embodiments of the present disclosure, the OAM mode determined by the network device may include one or more OAM mode combinations, and each OAM mode combination may include at least one of the following OAM modes: an OAM mode with $l=-1$, an OAM mode with $l=0$, or an OAM mode with $l=1$. It can be understood that $l$ of the OAM mode may include one or more of the following combinations: [0], [1], [−1], [−1, 1], [0, −1], [0, 1], [−1, 0, 1].

In the S1002, the network device indicates the target OAM mode to a terminal device.

In some implementations of the present disclosure, the network device may send transmission mode indication information to the terminal device. The transmission mode indication information is configured to indicate the target OAM mode to the terminal device, so that the terminal device can determine the target OAM mode according to the transmission mode indication information.

In practical applications, the network device may set corresponding index values for different OAM modes, and the network device sends an index value of the target OAM mode to the terminal device, so that the terminal device can determines the target OAM mode based on the index value. Alternatively, the network device may directly send an eigenvalue of the target OAM mode to the terminal device, so that the terminal device can determine the target OAM mode based on the eigenvalue. Alternatively, the network device may also set other identities for different OAM modes to characterize the target OAM mode determined by the network device itself, so that the terminal device can determine the target OAM mode.

In some implementations of the present disclosure, the network device may indicate the target OAM mode to the terminal device through the RRC signaling, the DCI, the MAC CE, etc.

In practical applications, S1001 and S1002 may be executed during the access (such as the initial access, the re-access, etc.) to the network device by the terminal device, or when the network device updates an OAM mode configuration. Alternatively, S1001 and S1002 may also be executed at other timings, which are not specifically limited by embodiments of the present disclosure.

In the S1003, after the terminal device enters a connected state, the network device transmits a control channel according to the target OAM mode.

Here, the terminal device enters the connected state after accessing the network device. Next, the network device may use the OAM mode determined in S1001 as the target OAM mode and indicate it to the terminal device for the subsequent control channel transmission.

Here, for an execution process of S1003, reference may be made to a specific description of S802 in embodiments of FIG. 8, which will not be described in detail here.

Figure 11:
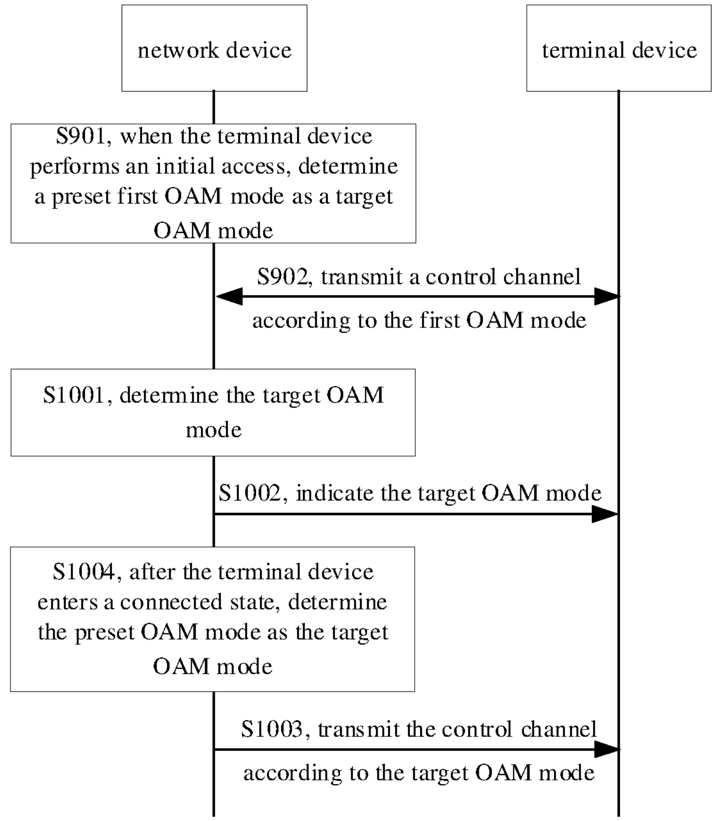
FIG. 11 is a schematic flowchart of an implementation of a ninth OAM-based communication method according to an embodiment of the present disclosure.

In some implementations of the present disclosure, FIG. 11 is a schematic flowchart of an implementation of a ninth OAM-based communication method according to an embodiment of the present disclosure. As shown in FIG. 11, after completing the initial access by transmitting the control channel according to the preset OAM mode through the above S901 to S902, the terminal device enters the connected state, and thereafter, if the network device needs to indicate the preset OAM mode to the terminal device, the network executes S1002, and on the contrary, if the network device does not need to indicate the target OAM mode to the terminal device, the method further includes: in S1004, after the terminal device enters the connected state, the network device determines the preset OAM mode as the target OAM mode, that is, the network device still determines the default OAM mode as the target OAM mode. Next, the network device executes S1003.

It can be understood that in embodiments of FIG. 11, the network device uses the preset OAM mode as the target OAM mode during the initial access of the terminal device to transmit the control channel. After the terminal device completes the initial access and enters the connected state, the network device may indicate the target OAM mode to the terminal device for the terminal device to transmit the control channel. After the terminal device enters the connected state, if the network device does not need to indicate the target OAM mode to the terminal device, the network device still uses the preset OAM mode as the target OAM mode to transmit the control channel.

Figure 12:
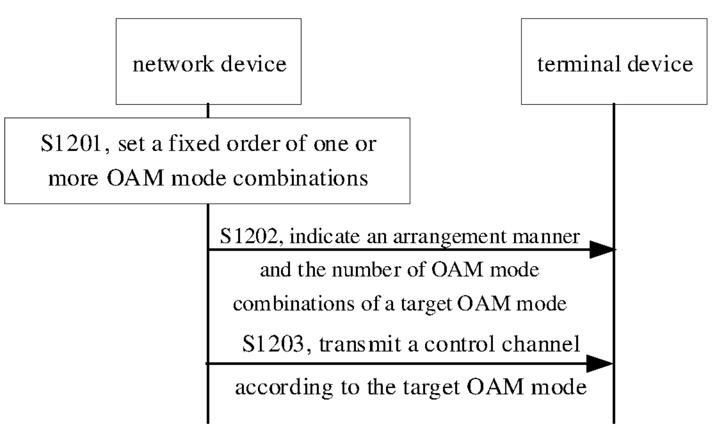
FIG. 12 is a schematic flowchart of an implementation of a tenth OAM-based communication method according to an embodiment of the present disclosure.

In some implementations of the present disclosure, the one or more OAM mode combinations may be arranged in a fixed order. The network device may configure for the terminal device an arrangement manner and the number of one or more OAM mode combinations, and indicates them to the terminal device. FIG. 12 is a schematic flowchart of an implementation of a tenth OAM-based communication method according to an embodiment of the present disclosure. Referring to FIG. 12, the method includes S1201 to S1203.

In the S1201, a network device sets a fixed order of one or more OAM mode combinations.

In the S1202, the network device indicates to the terminal device an arrangement manner and the number of OAM mode combinations of the target OAM mode.

Here, in S1201 to S1202, the network device sets that the one or more OAM mode combinations are arranged in a fixed order. For example, $l$ of the OAM modes may be arranged in the following order: [0], [1], [−1], [−1, 1], [0, −1], [0, 1], [−1, 0, 1]. The network device may determine one or more OAM mode combinations among the OAM mode combinations arranged in the above fixed order as the target OAM mode, and indicate the arrangement manner and the number of OAM mode combinations to the terminal device. For example, the network device indicates to the terminal device the above arrangement order, and that the number of OAM mode combinations is 3. In this case, $l$ of the OAM modes indicated by the network device is [0], [1], [−1], that is, the first three OAM mode combinations in the above arrangement order. Then, the terminal device may determine the OAM modes whose l is [0], [1], [−1] as the target OAM mode. Alternatively, the arrangement order of one or more OAM mode combinations may also be in other orders, which is not specifically limited in embodiments of the present disclosure.

In the S1203, the network device transmits a control channel according to the target OAM mode.

Here, for an execution process of S1203, reference may be made to a specific description of S802 in embodiments of FIG. 8, which will not be described in detail here.

At this point, the transmission of the control channel is completed.

In embodiments of the present disclosure, the network device transmits the control channel according to the OAM mode with better stability, that is, one or more OAM modes among the OAM mode with the eigenvalue of −1, the OAM mode with the eigenvalue of 0, and the OAM mode with the eigenvalue of 1, thereby increasing the robustness of the control channel and improving the reliability of the system.

Figure 13:
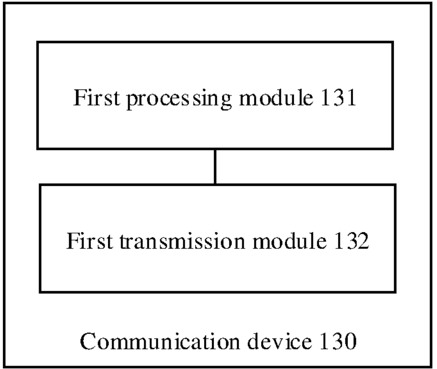
FIG. 13 is a schematic diagram of a first communication device according to an embodiment of the present disclosure.

Based on the same inventive concept, embodiments of the present disclosure provide a communication device, which may be the above terminal device in the OAM-based communication system or a chip in the terminal device or a system-on-chip, or may also be a function module in the terminal device configured to implement the corresponding method. The communication device may realize functions performed by the terminal device, and these functions may be realized by hardware executing corresponding software. The hardware or software includes one or more modules corresponding to the above functions. FIG. 13 is a schematic diagram of a first communication device according to an embodiment of the present disclosure. Referring to FIG. 13, the communication device 130 may include: a first processing module 131, configured to obtain a first OAM mode indicated by a network device; and a first transmission module 132, configured to transmit a control channel according to the first OAM mode after a connected state is entered.

In some implementations of the present disclosure, the first OAM mode includes one or more OAM mode combinations, and each OAM mode combination includes at least one OAM mode.

In some implementations of the present disclosure, the at least one OAM mode includes: an OAM mode with an eigenvalue of −1, an OAM mode with an eigenvalue of 0, and an OAM mode with an eigenvalue of 1.

In some implementations of the present disclosure, the first transmission module is further configured to, when the first OAM mode includes a plurality of OAM mode combinations, call the plurality of OAM mode combinations in a polling manner to transmit the control channel.

In some implementations of the present disclosure, the first transmission module is further configured to receive transmission mode indication information sent by a network device, wherein the transmission mode indication information is configured to indicate the first OAM mode; and the first processing module is configured to determine the first OAM mode according to the transmission mode indication information.

In some implementations of the present disclosure, the transmission mode indication information includes an arrangement manner of the one or more OAM mode combinations and the number of OAM mode combinations.

In some implementations of the present disclosure, the first processing module is further configured to obtain a preset second OAM mode when performing an initial access with the network device; and the first transmission module is further configured to transmit the control channel according to the second OAM mode during the initial access.

In some implementations of the present disclosure, the first transmission module is further configured to transmit the control channel according to the second OAM mode after the terminal device is in a connected state if the first OAM mode indicated by the network device is not obtained by the terminal device.

In some implementations of the present disclosure, the control channel includes a PUCCH and/or a PDCCH.

It should be noted that for specific implementation processes of the first processing module 131 and the first transmission module 132, reference may be made to the detailed description of embodiments in FIGS. 2 to 7. For the sake of simplicity of the description, repeated description will not be given again here.

The first transmission module 132 mentioned in embodiments of the present disclosure may be a transceiver interface, a transceiver circuit, a transceiver, etc., and the first processing module 131 mentioned in embodiments of the present disclosure may be one or more processors.

Figure 14:
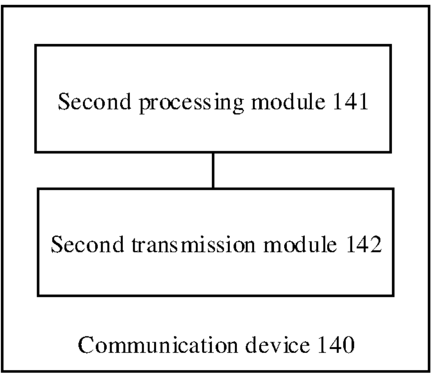
FIG. 14 is a schematic diagram of a second communication device according to an embodiment of the present disclosure.

Based on the same inventive concept, embodiments of the present disclosure provide a communication device, which may be the above terminal device in the OAM-based communication system or a chip in the terminal device or a system-on-chip, or may also be a function module in the terminal device configured to implement the corresponding method. The communication device may realize functions performed by the terminal device, and these functions may be realized by hardware executing corresponding software. The hardware or software includes one or more modules corresponding to the above functions. FIG. 14 is a schematic diagram of a second communication device according to an embodiment of the present disclosure. Referring to FIG. 14, the communication device 140 may include: a second processing module 141, configured to obtain a preset OAM mode when an initial access is performed by the terminal device with a network device; and a second transmission module 142, configured to transmit a control channel according to the preset OAM mode during the initial access.

In some implementations of the present disclosure, the preset OAM mode includes an OAM mode, and the OAM mode is: an OAM mode with an eigenvalue of −1, an OAM mode with an eigenvalue of 0, or an OAM mode with an eigenvalue of 1.

In some implementations of the present disclosure, the control channel includes a PUCCH and/or a PDCCH.

It should be noted that for specific implementation processes of the second processing module 141 and the second transmission module 142, reference may be made to the detailed description of embodiments in FIGS. 2 to 4. For the sake of simplicity of the description, the repeated description will not be given again here.

The second transmission module 142 mentioned in embodiments of the present disclosure may be a transceiver interface, a transceiver circuit, a transceiver, etc., and the second processing module 141 mentioned in embodiments of the present disclosure may be one or more processors.

Figure 15:
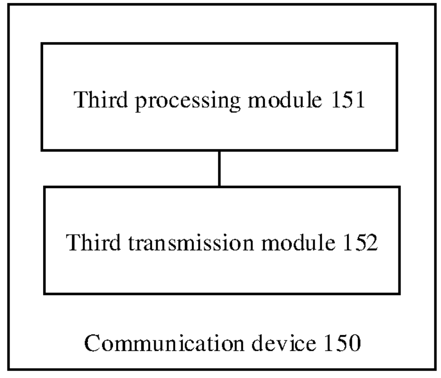
FIG. 15 is a schematic diagram of a third communication device according to an embodiment of the present disclosure.

Based on the same inventive concept, embodiments of the present disclosure provide a communication device, which may be the above network device in the OAM-based communication system or a chip in the network device or a system-on-chip, or may also be a function module in the network device configured to implement the corresponding method. The communication device may realize functions performed by the network device, and these functions may be realized by hardware executing corresponding software. The hardware or software includes one or more modules corresponding to the above functions. FIG. 15 is a schematic diagram of a third communication device according to an embodiment of the present disclosure. As shown in FIG. 15, the communication device 150 includes: a third processing module 151, configured to determine a first OAM mode; and a third transmission module 152, configured to indicate the first OAM mode to a terminal device, and the first OAM mode is used by the terminal device to transmit a control channel.

In some implementations of the present disclosure, the first OAM mode includes one or more OAM mode combinations, and each OAM mode combination includes at least one OAM mode.

In some implementations of the present disclosure, the at least one OAM mode includes: an OAM mode with an eigenvalue of −1, an OAM mode with an eigenvalue of 0, or an OAM mode with an eigenvalue of 1.

In some implementations of the present disclosure, the third transmission module is configured to send transmission mode indication information to the terminal device, and the transmission mode indication information is configured to indicate the first OAM mode.

In some implementations of the present disclosure, the transmission mode indication information includes an arrangement manner of the one or more OAM mode combinations and the number of OAM mode combinations.

In some implementations of the present disclosure, the third transmission module is configured to, after the first OAM mode is determined by the third processing module, transmit the control channel according to the first OAM mode after the terminal device is determined to be in a connected state.

In some implementations of the present disclosure, the third processing module is configured to update the first OAM mode after determining that the terminal device is in the connected state.

In some implementations of the present disclosure, the third processing module is further configured to, before determining the first OAM mode, obtain a preset second OAM mode when an initial access is performed by the network device with the terminal device; and the third transmission module is configured to transmit the control channel according to the second OAM mode during the initial access.

In some implementations of the present disclosure, the control channel includes a PUCCH and/or a PDCCH.

It should be noted that for specific implementation processes of the third processing module 151 and the third transmission module 152, reference may be made to the detailed description of embodiments in FIGS. 8 to 11. For the sake of simplicity of the description, the repeated description will not be given again here.

The third transmission module 152 mentioned in embodiments of the present disclosure may be a transceiver interface, a transceiver circuit, a transceiver, etc., and the third processing module 151 mentioned in embodiments of the present disclosure may be one or more processors.

Figure 16:
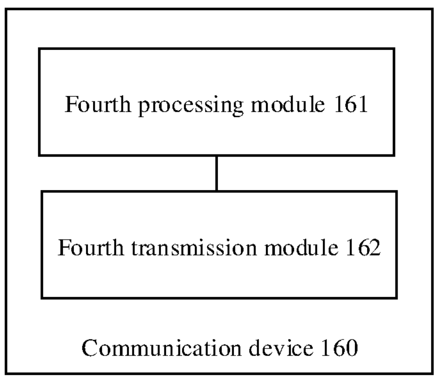
FIG. 16 is a schematic diagram of a fourth communication device according to an embodiment of the present disclosure.

Based on the same inventive concept, embodiments of the present disclosure provide a communication device, which may be the above network device in the OAM-based communication system or a chip in the network device or a system-on-chip, or may also be a function module in the network device configured to implement the corresponding method. The communication device may realize functions performed by the network device, and these functions may be realized by hardware executing corresponding software. The hardware or software includes one or more modules corresponding to the above functions. FIG. 16 is a schematic diagram of a fourth communication device according to an embodiment of the present disclosure. As shown in FIG. 16, the communication device 160 includes: a fourth processing module 161, configured to obtain a preset fourth OAM mode when an initial access is performed by the network device with a terminal device; and a fourth transmission module 162, configured to transmit a control channel according to the fourth OAM mode during the initial access.

In some implementations of the present disclosure, the fourth OAM mode includes an OAM mode, and the OAM mode is: an OAM mode with an eigenvalue of −1, an OAM mode with an eigenvalue of 0, or an OAM mode with an eigenvalue of 1.

In some implementations of the present disclosure, the control channel includes a PUCCH and/or a PDCCH.

It should be noted that for specific implementation processes of the fourth processing module 161 and the fourth transmission module 162, reference may be made to the detailed description of embodiments in FIGS. 8 to 9. For the sake of simplicity of the description, the repeated description will not be given again here.

The fourth transmission module 162 mentioned in embodiments of the present disclosure may be a transceiver interface, a transceiver circuit, a transceiver, etc., and the fourth processing module 161 mentioned in embodiments of the present disclosure may be one or more processors.

It should be noted that in embodiments of the present disclosure, the above-mentioned second OAM mode, third OAM mode or fourth OAM mode can be understood as the preset OAM mode. The above-mentioned first OAM mode can be understood as the OAM mode indicated by the network device or the OAM mode determined by the network device for itself.

Figure 17:
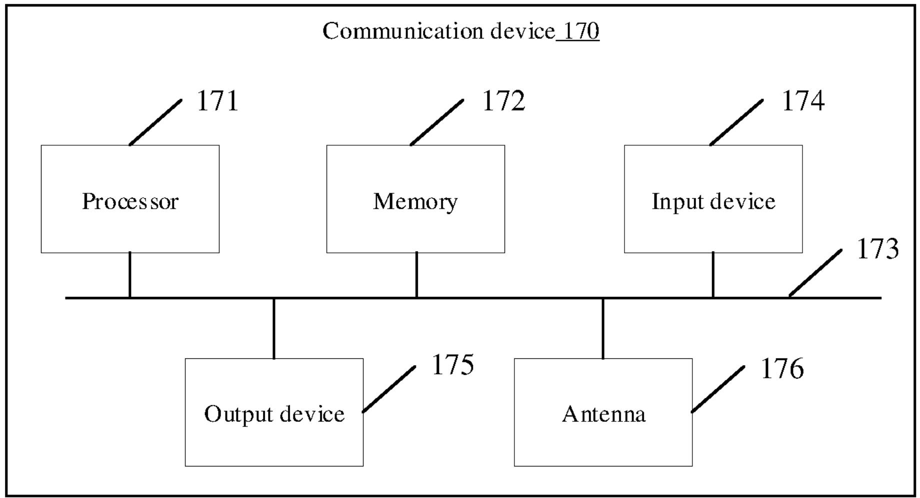
FIG. 17 is a schematic structural diagram of a communication device according to an embodiment of the present disclosure.

Based on the same inventive concept, embodiments of the present disclosure provide a communication device, which may be the terminal device or the network device in the above one or more embodiments. FIG. 17 is a schematic structural diagram of a communication device according to an embodiment of the present disclosure. As shown in FIG. 17, the communication device 170 adopts general computer hardware, including a processor 171, a memory 172, a bus 173, an input device 174 and an output device 175.

In some implementations of the present disclosure, the memory 172 may include a computer storage medium in a form of a volatile and/or nonvolatile memory, for example, a read-only memory and/or a random access memory. The memory 172 may store an operating system, an application program, another program module, an executable code, program data, user data, etc.

The input device 174 may be configured to input a command and information to the communication device. The input device 174 may be a keyboard or a pointing device, such as a mouse, a trackball, a touchpad, a microphone, a joystick, a game pad, a satellite television antenna, a scanner, or a similar device. These input devices may be connected to the processor 171 through the bus 173.

The output device 175 may be configured to output information to the communication device. In addition to a monitor, the output device 175 may also be another peripheral output device, such as a loudspeaker and/or a print device. These output devices may also be connected to the processor 171 through the bus 173.

The communication device may be connected to a network, for example, a local area network (LAN) through an antenna 176. In a networked environment, computer-executable instructions stored in a control device may be stored in a remote storage device, and is not necessarily stored locally.

When the processor 171 in the communication device executes the executable codes or the application program stored in the memory 172, the communication device executes the OAM-based communication method on the terminal device side or the access network device side in the above embodiments. For a specific execution process, reference may be made to the above embodiments and will not be described in detail here.

In addition, the memory 172 stores computer executable instructions for implementing functions of the first processing module 1301 and the first transmission module 1302 in FIG. 13 and the second processing module 1401 and the second transmission module 1402 in FIG. 14. The functions/implementation processes of the first processing module 1301 and the first transmission module 1302 in FIG. 13 and the second processing module 1401 and the second transmission module 1402 in FIG. 14 can all be implemented by the processor 171 in FIG. 17 calling the computer executable instructions stored in the memory 172. For specific implementation processes and functions, reference may be made to the above-mentioned related embodiments.

In addition, the memory 172 stores computer executable instructions for implementing functions of the third processing module 1501 and the third transmission module 1502 in FIG. 15 and the fourth processing module 1601 and the fourth transmission module 1602 in FIG. 16. The functions/implementation processes of the third processing module 1501 and the third transmission module 1502 in FIG. 15 and the fourth processing module 1601 and the fourth transmission module 1602 in FIG. 16 can all be implemented by the processor 171 in FIG. 17 calling the computer executable instructions stored in the memory 172. For specific implementation processes and functions, reference may be made to the above-mentioned related embodiments.

Based on the same inventive concept, embodiments of the present disclosure provide a terminal device that is consistent with the terminal device in the above one or more embodiments. In some embodiments of the present disclosure, the terminal device may be a mobile phone, a computer, a digital broadcast terminal, a messaging device, a gaming console, a tablet, a medical device, an exercise device, a personal digital assistant, etc.

Figure 18:
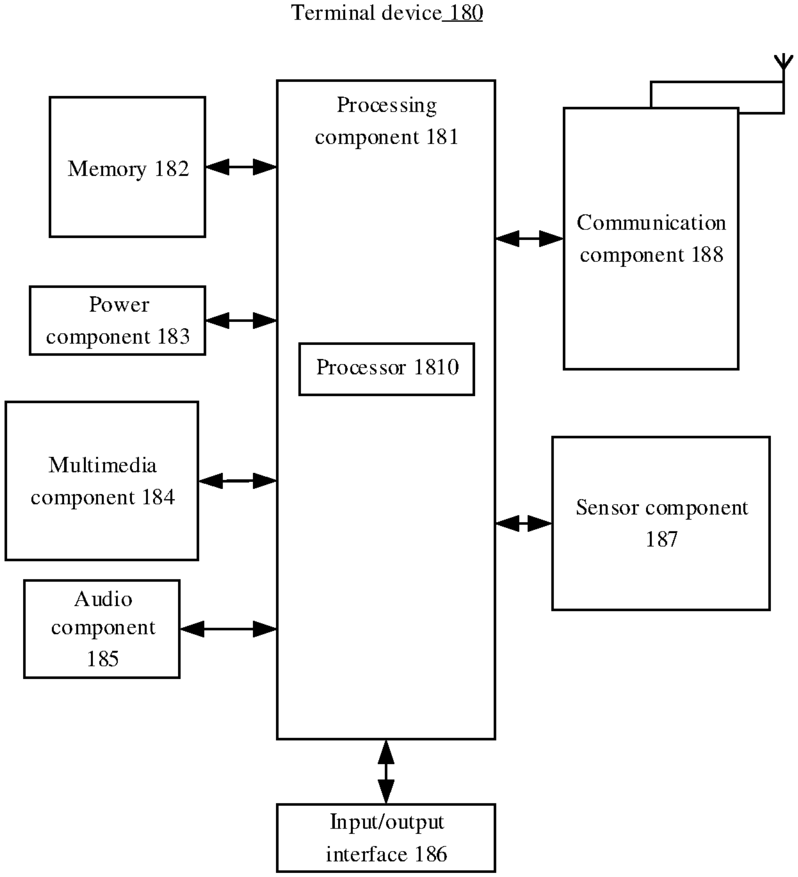
FIG. 18 is a schematic structural diagram of a terminal device according to an embodiment of the present disclosure.

FIG. 18 is a schematic structural diagram of a terminal device according to an embodiment of the present disclosure. Referring to FIG. 18, the terminal device 180 may include one or more of the following components: a processing component 181, a memory 182, a power component 183, a multimedia component 184, an audio component 185, an input/output (I/O) interface 186, a sensor component 187, and a communication component 188.

The processing component 181 typically controls overall operations of the terminal device 180, such as the operations associated with display, telephone calls, data communications, camera operations, and recording operations. The processing component 181 may include one or more processors 1810 to execute instructions to perform all or part of the steps in the above described methods. Moreover, the processing component 181 may include one or more modules which facilitate the interaction between the processing component 181 and other components. For instance, the processing component 181 may include a multimedia module to facilitate the interaction between the multimedia component 184 and the processing component 181.

The memory 182 is configured to store various types of data to support the operation of the terminal device 180. Examples of such data include instructions for any applications or methods operated on the terminal device 180, contact data, phonebook data, messages, pictures, video, etc. The memory 182 may be implemented using any type of volatile or non-volatile memory apparatuses, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 183 provides power to various components of the terminal device 180. The power component 183 may include a power management system, one or more power sources, and any other components associated with the generation, management, and distribution of power in the terminal device 180.

The multimedia component 184 includes a screen providing an output interface between the terminal device 180 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 184 includes a front camera and/or a rear camera. The front camera and the rear camera may receive an external multimedia datum while the terminal device 180 is in an operation mode, such as a photographing mode or a video mode. Each of the front camera and the rear camera may be a fixed optical lens system or have focus and optical zoom capability.

The audio component 185 is configured to output and/or input audio signals. For example, the audio component 185 includes a microphone (MIC) configured to receive an external audio signal when the terminal device 180 is in an operation mode, such as a call mode, a recording mode, and a voice recognition mode. The received audio signal may be further stored in the memory 182 or transmitted via the communication component 188. In some embodiments, the audio component 185 further includes a speaker to output audio signals.

The I/O interface 186 provides an interface between the processing component 181 and peripheral interface modules, such as a keyboard, a click wheel, buttons, and the like. The buttons may include, but are not limited to, a home button, a volume button, a starting button, and a locking button.

The sensor component 187 includes one or more sensors to provide state assessments of various aspects of the terminal device 180. For instance, the sensor component 187 may detect an open/closed state of the terminal device 180, relative positioning of components, e.g., the display and the keypad, of the terminal device 180, a change in position of the terminal device 180 or a component of the terminal device 180, a presence or absence of user contact with the terminal device 180, an orientation or an acceleration/deceleration of the terminal device 180, and a change in temperature of the terminal device 180. The sensor component 187 may include a proximity sensor configured to detect the presence of nearby objects without any physical contact. The sensor component 187 may also include a light sensor, such as a CMOS or CCD image sensor, for use in imaging applications. In some embodiments, the sensor component 187 may also include an accelerometer sensor, a gyroscope sensor, a magnetic sensor, a pressure sensor, or a temperature sensor.

The communication component 188 is configured to facilitate communication, wired or wirelessly, between the terminal device 180 and other devices. The terminal device 180 may access a wireless network based on a communication standard, such as WiFi, 2G, or 3G, or a combination thereof. In an embodiment, the communication component 188 receives a broadcast signal or broadcast associated information from an external broadcast management system via a broadcast channel. In an embodiment, the communication component 188 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the terminal device 180 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

Based on the same inventive concept, embodiments of the present disclosure provide a network device that is consistent with the network device in the above one or more embodiments.

Figure 19:
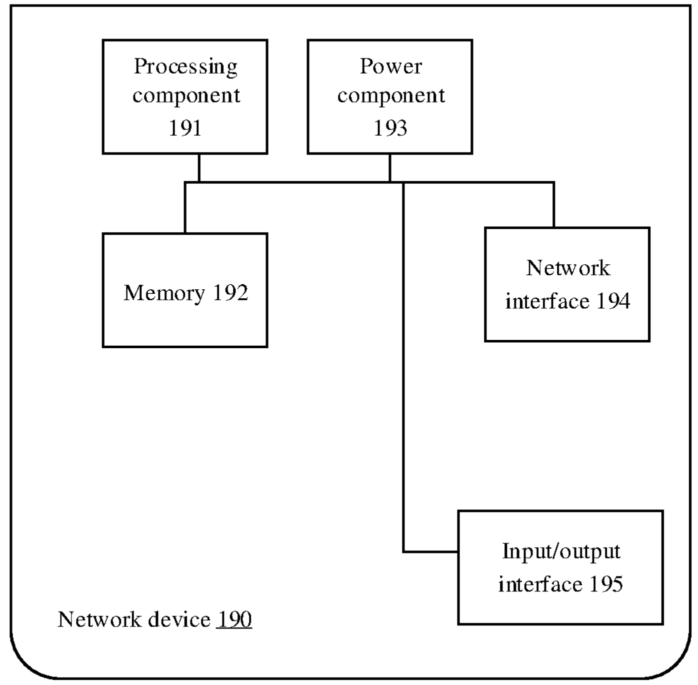
FIG. 19 is a schematic structural diagram of a network device according to an embodiment of the present disclosure.

FIG. 19 is a schematic structural diagram of a network device according to an embodiment of the present disclosure. Referring to FIG. 19, the network device 190 may include a processing component 191, which further includes one or more processors and a memory resource represented by a memory 192 for storing instructions executable by the processing component 191, such as an application program. The application program stored in the memory 192 may include one or more modules, each corresponding to a set of instructions. In addition, the processing component 191 is configured to execute the instructions to execute any of the aforementioned methods applied on the network device.

The network device 190 may also include: a power component 193 configured to perform power management of the network device 190, a wired or wireless network interface 194 configured to connect the network device 190 to the network, and an input/output (I/O) interface 195. The network device 190 may operate an operating system stored in the memory 192, such as Windows Server™, Mac OS X™, Unix™, Linux™, FreeBSD™, or the like.

Based on the same inventive concept, embodiments of the present disclosure further provide a communication device, such as a terminal device, which may include: a memory; and a processor, connected to the memory, and configured to execute computer-executable instructions stored on the memory to implement the OAM-based communication method on the terminal device side in one or more of the above embodiments.

Based on the same inventive concept, embodiments of the present disclosure further provide a communication device, such as a network device, which may include: a memory; and a processor, connected to the memory, and configured to execute computer-executable instructions stored on the memory to implement the OAM-based communication method on the network device side in one or more of the above embodiments.

Based on the same inventive concept, embodiments of the present disclosure further provide a computer-readable storage medium having instructions stored thereon. The instructions are configured to, when run on a computer, execute the OAM-based communication method on the terminal device side or the network device side in one or more of the above embodiments.

Based on the same inventive concept, embodiments of the present disclosure further provide a computer program or a computer program product. The computer program product, when executed on a computer, causes the computer to implement the OAM-based communication method on the terminal device side or the network device side in one or more of the above embodiments.

The present disclosure provides an OAM-based communication method, apparatus and device to increase robustness of a control channel and improve reliability of a communication system.

In a first aspect, the present disclosure provides an OAM-based communication method, which may be applied to a terminal device in an OAM-based communication system. The method may include: obtaining, by the terminal device, a target OAM mode; and transmitting, by the terminal device, a control channel according to the target OAM mode.

Here, the target OAM mode can be understood as a transmission mode for the control channel. The terminal device and a network device transmit the control channel according to the transmission mode.

For example, the control channel may include a physical uplink control channel (PUCCH) and/or a physical downlink control channel (PDCCH).

In some implementations of the present disclosure, the target OAM mode includes one or more OAM mode combinations, and each OAM mode combination includes at least one of: an OAM mode with an eigenvalue of −1, an OAM mode with an eigenvalue of 0, and an OAM mode with an eigenvalue of 1.

For example, an eigenvalue of an OAM mode in an OAM mode combination may include one or more of: [0], [1], [−1], [−1, 1], [0, −1], [0, 1], [−1, 0, 1].

In some implementations of the present disclosure, when the target OAM mode includes a plurality of OAM mode combinations, the transmitting, by the terminal device, the control channel according to the target OAM mode includes: calling, by the terminal device, the plurality of OAM mode combinations in a polling manner to transmit the control channel.

In some implementations of the present disclosure, the obtaining, by the terminal device, the target OAM mode includes: determining, by the terminal device, a preset OAM mode (i.e., a second OAM mode) as the target OAM mode; or determining, by the terminal device, an OAM mode (i.e., a first OAM mode) indicated by a network device as the target OAM mode.

In some implementations of the present disclosure, the obtaining, by the terminal device, the target OAM mode includes: when performing an initial access, determining, by the terminal device, the preset OAM mode as the target OAM mode.

In some implementations of the present disclosure, the obtaining, by the terminal device, the target OAM mode includes: obtaining, by the terminal device, the OAM mode indicated by the network device; and after entering a connected state, determining, by the terminal device, the OAM mode indicated by the network device as the target OAM mode.

In some implementations of the present disclosure, the obtaining, by the terminal device, the OAM mode indicated by the network device includes: receiving, by the terminal device, transmission mode indication information sent by the network device, wherein the transmission mode indication information is configured to indicate the target OAM mode to the terminal device; and determining, by the terminal device, the target OAM mode according to the transmission mode indication information.

In some implementations of the present disclosure, the method further includes: if the OAM mode indicated by the network device is not obtained by the terminal device, determining, by the terminal device, the preset OAM mode as the target OAM mode after entering the connected state.

In a second aspect, the present disclosure provides an OAM-based communication method, which may be applied to a terminal device in an OAM-based communication system. The method may include: obtaining, by the terminal device, a preset OAM mode (i.e., a third OAM mode) when performing an initial access with a network device; and transmitting, by the terminal device, a control channel according to the preset OAM mode during the initial access.

In some implementations of the present disclosure, the preset OAM mode includes an OAM mode, and the OAM mode is: an OAM mode with an eigenvalue of −1, an OAM mode with an eigenvalue of 0, or an OAM mode with an eigenvalue of 1.

In some implementations of the present disclosure, the control channel may include a PUCCH and/or a PDCCH.

In a third aspect, the present disclosure provides an OAM-based communication method, which may be applied to a network device in an OAM-based communication system. The method may include: determining, by the network device, a target OAM mode; and transmitting, by the network device, a control channel according to the target OAM mode.

In some implementations of the present disclosure, the target OAM mode includes one or more OAM mode combinations, and each OAM mode combination includes at least one of: an OAM mode with an eigenvalue of −1, an OAM mode with an eigenvalue of 0, and an OAM mode with an eigenvalue of 1.

In some implementations of the present disclosure, after the determining, by the network device, the target OAM mode, the method further includes: indicating, by the network device, the target OAM mode to a terminal device.

In some implementations of the present disclosure, the indicating, by the network device, the target OAM mode to the terminal device includes: sending, by the network device, transmission mode indication information to the terminal device, wherein the transmission mode indication information is configured to indicate the target OAM mode.

In some implementations of the present disclosure, the determining, by the network device, the target OAM mode includes: determining, by the network device, a preset OAM mode (i.e., a second OAM mode) as the target OAM mode.

In some implementations of the present disclosure, the determining, by the network device, the target OAM mode includes: determining, by the network device, the preset OAM mode as the target OAM mode, when an initial access is performed by the terminal device with the network device.

In some implementations of the present disclosure, the transmitting, by the network device, the control channel according to the target OAM mode includes: transmitting, by the network device, the control channel according to the target OAM mode after the terminal device is in a connected state.

In some implementations of the present disclosure, the control channel includes a PUCCH and/or a PDCCH.

In a fourth aspect, the present disclosure provides an orbital angular momentum (OAM)-based communication method, which may be applied to a network device in an OAM-based communication system. The method may include: obtaining, by the network device, a preset OAM mode (i.e., a fourth OAM mode) when performing an initial access with a terminal device; and transmitting, by the network device, a control channel according to the preset OAM mode during the initial access.

In some implementations of the present disclosure, the preset OAM mode includes an OAM mode, and the OAM mode is: an OAM mode with an eigenvalue of −1, an OAM mode with an eigenvalue of 0, or an OAM mode with an eigenvalue of 1.

In some implementations of the present disclosure, the control channel includes a PUCCH and/or a PDCCH.

It should be noted that in the present disclosure, the second OAM mode, the third OAM mode or the fourth OAM mode can be understood as the preset OAM mode. The first OAM mode can be understood as the OAM mode indicated by the network device or the OAM mode determined by the network device for itself.

In a fifth aspect, the present disclosure provides a communication device, which may be the above terminal device in the OAM-based communication system or a chip in the terminal device or a system-on-chip, or may also be a function module in the terminal device configured to implement the method in the first aspect. The communication device may realize functions performed by the terminal device in the first aspect, and these functions may be realized by hardware executing corresponding software. The hardware or software includes one or more modules corresponding to the above functions. The communication device includes: a first processing module, configured to obtain a first OAM mode indicated by a network device; and a first transmission module, configured to transmit a control channel according to the first OAM mode after entering a connected state.

In some implementations of the present disclosure, the first OAM mode includes one or more OAM mode combinations, and each OAM mode combination includes at least one OAM mode.

In some implementations of the present disclosure, the at least one OAM mode includes: an OAM mode with an eigenvalue of −1, an OAM mode with an eigenvalue of 0, and an OAM mode with an eigenvalue of 1.

In some implementations of the present disclosure, the first transmission module is further configured to, when the first OAM mode includes a plurality of OAM mode combinations, call the plurality of OAM mode combinations in a polling manner to transmit the control channel.

In some implementations of the present disclosure, the first transmission module is further configured to receive transmission mode indication information sent by a network device, wherein the transmission mode indication information is configured to indicate the first OAM mode; and the first processing module is configured to determine the first OAM mode according to the transmission mode indication information.

In some implementations of the present disclosure, the transmission mode indication information includes an arrangement manner of the one or more OAM mode combinations and the number of OAM mode combinations.

In some implementations of the present disclosure, the first processing module is further configured to obtain a preset second OAM mode when performing an initial access with the network device; and the first transmission module is further configured to transmit the control channel according to the second OAM mode during the initial access.

In some implementations of the present disclosure, the first transmission module is further configured to transmit the control channel according to the second OAM mode after the terminal device is in a connected state if the first OAM mode indicated by the network device is not obtained by the terminal device.

In some implementations of the present disclosure, the control channel includes a PUCCH and/or a PDCCH.

In a sixth aspect, the present disclosure provides a communication device, which may be the above terminal device in the OAM-based communication system or a chip in the terminal device or a system-on-chip, or may also be a function module in the terminal device configured to implement the method in the second aspect. The communication device may realize functions performed by the terminal device in the second aspect, and these functions may be realized by hardware executing corresponding software. The hardware or software includes one or more modules corresponding to the above functions. The communication device includes: a second processing module, configured to obtain a preset third OAM mode when an initial access is performed by the terminal device with a network device; and a second transmission module, configured to transmit a control channel according to the preset third OAM mode during the initial access.

In some implementations of the present disclosure, the preset third OAM mode includes an OAM mode, and the third OAM mode is: an OAM mode with an eigenvalue of −1, an OAM mode with an eigenvalue of 0, or an OAM mode with an eigenvalue of 1.

In some implementations of the present disclosure, the control channel includes a PUCCH and/or a PDCCH.

In a seventh aspect, the present disclosure provides a communication device, which may be the above network device in the OAM-based communication system or a chip in the network device or a system-on-chip, or may also be a function module in the network device configured to implement the method in the third aspect. The communication device may realize functions performed by the network device in the third aspect, and these functions may be realized by hardware executing corresponding software. The hardware or software includes one or more modules corresponding to the above functions. The communication device includes: a third processing module, configured to determine a first OAM mode; and a third transmission module, configured to indicate the first OAM mode to a terminal device, wherein the first OAM mode is used by the terminal device to transmit a control channel.

In some implementations of the present disclosure, the first OAM mode includes one or more OAM mode combinations, and each OAM mode combination includes at least one OAM mode.

In some implementations of the present disclosure, the at least one OAM mode includes: an OAM mode with an eigenvalue of −1, an OAM mode with an eigenvalue of 0, or an OAM mode with an eigenvalue of 1.

In some implementations of the present disclosure, the third transmission module is configured to send transmission mode indication information to the terminal device, and the transmission mode indication information is configured to indicate the first OAM mode.

In some implementations of the present disclosure, the transmission mode indication information includes an arrangement manner of the one or more OAM mode combinations and the number of OAM mode combinations.

In some implementations of the present disclosure, the third transmission module is configured to, after the first OAM mode is determined by the third processing module, transmit the control channel according to the first OAM mode after the terminal device is determined to be in a connected state.

In some implementations of the present disclosure, the third processing module is configured to update the first OAM mode after determining that the terminal device is in the connected state.

In some implementations of the present disclosure, the third processing module is further configured to, before determining the first OAM mode, obtain a preset second OAM mode when an initial access is performed by the network device with the terminal device; and the third transmission module is configured to transmit the control channel according to the second OAM mode during the initial access.

In some implementations of the present disclosure, the control channel includes a PUCCH and/or a PDCCH.

In an eighth aspect, the present disclosure provides a communication device, which may be the above network device in the OAM-based communication system or a chip in the network device or a system-on-chip, or may also be a function module in the network device configured to implement the method in the fourth aspect. The communication device may realize functions performed by the network device in the fourth aspect, and these functions may be realized by hardware executing corresponding software. The hardware or software includes one or more modules corresponding to the above functions. The communication device includes: a fourth processing module, configured to obtain a preset fourth OAM mode when an initial access is performed by the network device with a terminal device; and a fourth transmission module, configured to transmit a control channel according to the fourth OAM mode during the initial access.

In some implementations of the present disclosure, the fourth OAM mode includes an OAM mode, and the OAM mode is: an OAM mode with an eigenvalue of −1, an OAM mode with an eigenvalue of 0, or an OAM mode with an eigenvalue of 1.

In some implementations of the present disclosure, the control channel includes a PUCCH and/or a PDCCH.

In a ninth aspect, the present disclosure further provides a communication device, such as a terminal device, which may include: a memory; and a processor connected to the memory and configured to execute computer-executable instructions stored on the memory to implement the OAM-based communication method in the first aspect and the second aspect and any of implementations of the first aspect and the second aspect.

In a tenth aspect, the present disclosure further provides a communication device, such as a network device, which may include: a memory; and a processor connected to the memory and configured to execute computer-executable instructions stored on the memory to implement the OAM-based communication method in the third aspect and the fourth aspect and any of implementations of the third aspect and the fourth aspect.

In an eleventh aspect, the present disclosure further provides a computer storage medium and a processing module, wherein computer-executable instructions are stored on the computer storage medium, and the computer-executable instructions, when executed by a processor, implement the OAM-based communication method in the first to fourth aspects and any of implementations of the first to fourth aspects.

In the present disclosure, the terminal device and the network device transmit the control channel according to the OAM mode with better stability, that is, one or more OAM modes among the OAM mode with the eigenvalue of −1, the OAM mode with the eigenvalue of 0, and the OAM mode with the eigenvalue of 1, thereby increasing the robustness of the control channel and improving the reliability of the system.

It should be understood that the fifth to eleventh aspects of the present disclosure are consistent with the technical solutions of the first to fourth aspects of the present disclosure, and the beneficial effects achieved by each aspect and corresponding feasible implementations are similar, and will not be described again.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including the common general knowledge or habitual technical means in the technical field not disclosed in the present disclosure. The specification and embodiments are considered as exemplary only, and a true scope and spirit of the present disclosure is indicated by the appending claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. An orbital angular momentum (OAM)-based communication method, comprising:
- obtaining, by a terminal device, a first OAM mode indicated by a network device; and
- transmitting, by the terminal device, a control channel according to the first OAM mode, after entering a connected state;
- wherein the first OAM mode comprises at least one OAM mode of: an OAM mode with an eigenvalue of −1, an OAM mode with an eigenvalue of 0, or an OAM mode with an eigenvalue of 1;
- wherein the method further comprises:
- obtaining, by the terminal device, a preset second OAM mode, when performing an initial access with the network device; and
- transmitting, by the terminal device, the control channel according to the second OAM mode during the initial access.

2. The method according to claim 1, wherein the first OAM mode comprises one or more OAM mode combinations, and each OAM mode combination comprises the at least one OAM mode.

3. The method according to claim 1, wherein in a case that the first OAM mode comprises a plurality of OAM mode combinations, the transmitting, by the terminal device, the control channel according to the first OAM mode comprises:
- calling, by the terminal device, the plurality of OAM mode combinations in a polling manner to transmit the control channel.

4. The method according to claim 1, wherein the obtaining, by the terminal device, the first OAM mode indicated by the network device comprises:
- receiving, by the terminal device, transmission mode indication information sent by the network device, wherein the transmission mode indication information is configured to indicate the first OAM mode; and
- determining, by the terminal device, the first OAM mode according to the transmission mode indication information.

5. The method according to claim 4, wherein the transmission mode indication information comprises an arrangement manner of one or more OAM mode combinations and a number of OAM mode combinations.

6. The method according to claim 1, further comprising:
- transmitting, by the terminal device, the control channel according to the second OAM mode after entering the connected state, if the first OAM mode indicated by the network device is not obtained by the terminal device.

7. The method according to claim 1, wherein the control channel comprises at least one of a physical uplink control channel or a physical downlink control channel.

8. A non-transitory computer-readable storage medium having stored therein computer-executable instructions that, when executed by a processor, cause the processor to perform the OAM-based communication method according to claim 1.

9. An orbital angular momentum (OAM)-based communication method, comprising:
- determining, by a network device, a first OAM mode; and
- indicating, by the network device, the first OAM mode to a terminal device, wherein the first OAM mode is used by the terminal device to transmit a control channel;
- wherein the first OAM mode comprises at least one OAM mode of: an OAM mode with an eigenvalue of −1, an OAM mode with an eigenvalue of 0, or an OAM mode with an eigenvalue of 1;
- wherein before the determining, by the network device, the first OAM mode, the method further comprises:
- obtaining, by the network device, a preset second OAM mode when performing an initial access with the terminal device; and
- transmitting, by the network device, the control channel according to the second OAM mode during the initial access.

10. The method according to claim 9, wherein the first OAM mode comprises one or more OAM mode combinations, and each OAM mode combination comprises the at least one OAM mode.

11. The method according to claim 9, wherein the indicating, by the network device, the first OAM mode to the terminal device comprises:
- sending, by the network device, transmission mode indication information to the terminal device, wherein the transmission mode indication information is configured to indicate the first OAM mode.

12. The method according to claim 11, wherein the transmission mode indication information comprises an arrangement manner of one or more OAM mode combinations and a number of OAM mode combinations.

13. The method according to claim 9, wherein, after the determining, by the network device, the first OAM mode, the method further comprises:

transmitting, by the network device, the control channel according to the first OAM mode after determining that the terminal device is in a connected state.

14. The method according to claim 13, wherein the determining, by the network device, the first OAM mode comprises:

updating, by the network device, the first OAM mode after determining that the terminal device is in the connected state.

15. The method according to claim 9, wherein the control channel comprises at least one of a physical uplink control channel or a physical downlink control channel.

16. A communication device, comprising:

a memory storing computer-executable instructions; and a processor, connected to the memory and configured to perform the OAM-based communication method according to claim 9.

17. A non-transitory computer-readable storage medium having stored therein computer-executable instructions that, when executed by a processor, cause the processor to perform the OAM-based communication method according to claim 9.

18. A communication device, comprising:

a memory storing computer-executable instructions; and a processor, connected to the memory and configured to:

obtain a first OAM mode indicated by a network device; and transmit a control channel according to the first OAM mode, after entering a connected state;

wherein the first OAM mode comprises at least one OAM mode of: an OAM mode with an eigenvalue of −1, an OAM mode with an eigenvalue of 0, or an OAM mode with an eigenvalue of 1;

wherein the processor is further configured to:

obtain a preset second OAM mode, when performing an initial access with the network device; and transmit the control channel according to the second OAM mode during the initial access.

* * * * *